(No Model.)

G. W. GRAFFLIN, Jr.
NUT LOCK.

No. 490,553. Patented Jan. 24, 1893.

Witnesses.

Inventor.
George W. Grafflin Jr.
By James L. Norris.
Atty.

UNITED STATES PATENT OFFICE.

GEORGE W. GRAFFLIN, JR., OF BALTIMORE, MARYLAND.

NUT-LOCK.

SPECIFICATION forming part of Letters Patent No. 490,553, dated January 24, 1893.

Application filed October 8, 1892. Serial No. 448,234. (No model.)

*To all whom it may concern:*

Be it known that I, GEORGE W. GRAFFLIN, Jr., a citizen of the United States, residing at Baltimore, Maryland, have invented new and useful Improvements in Nut-Locks, of which the following is a specification.

This invention has for its object to provide a novel, simple, efficient and economical nut lock which is particularly designed for railway joints or fish plates, but is susceptible of being used wherever a non-rotary base plate or object is to be fastened by a bolt.

To accomplish this object my invention consists essentially in the combination of a base plate having a bolt hole and opposite undercut shoulders, with a bolt, an angular screw nut, and an arched metallic washer-plate formed with an angular orifice receiving the angular nut, said washer-plate being adapted to be pressed from its arched form into a flat condition so that opposite edges thereof interlock with the opposite undercut shoulders of the base plate.

Figure 1:
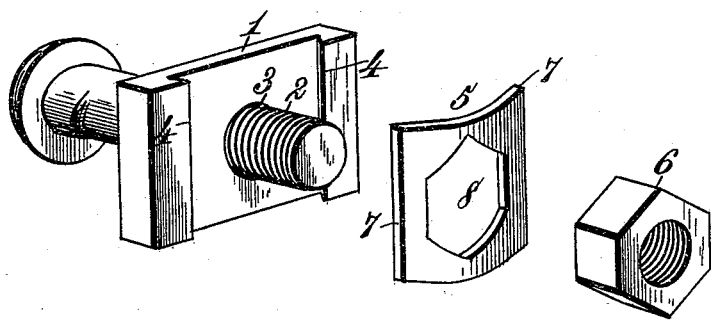
Figure 2:
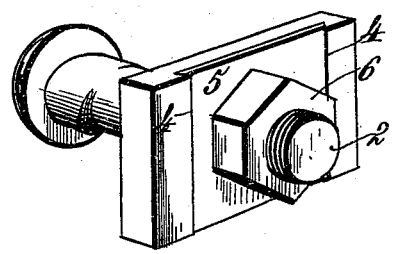

The invention is illustrated by the accompanying drawings, in which,

Figure 1, is a perspective view of a portion of a fish-plate, a bolt, a nut, and a washer-plate, constructed in accordance with my invention, the nut and washer-plate being separated from the other parts. Fig. 2, is a similar view showing the nut applied to the bolt and the washer-plate applied to prevent rotation of the nut.

In order to enable those skilled in the art to make and use my invention I will now describe the same in detail, referring to the drawings wherein The numeral 1 indicates a base-plate which may be the fish-plate of a railway joint or any other non-rotary object which is to be fastened by a bolt 2, passing through a bolt-hole 3, in such plate or object. For harmony in terms I will hereinafter term the plate or object 1 a base-plate. This base-plate may be of any desired length and is provided on its outer face with parallel shoulders 4, which are arranged opposite to each other so that the bolt-hole 3 is centrally between such shoulders. The shoulders are undercut so that they will enter into interlocking engagement with opposite edges of a metallic washer-plate 5, as will hereinafter appear. The screw nut 6 may be square, hexagonal or of any other angular shape, and its screw threaded orifice is adapted to engage the threaded portion of the bolt 2 in the usual manner. The metallic washer-plate 5 is of arched construction or is curved longitudinally and its opposite edges 7 are beveled to correspond substantially with the undercuts of the shoulders 4. The orifice 8 in the washer-plate 5 is of an angular form corresponding to the angular shape of the screw nut so that when the nut is engaged with said orifice it is impossible for the nut and washer-plate to turn independent of each other. In practice the nut is adjusted to the desired position and then the arched metallic plate is placed over the nut so that the latter enters the angular orifice 8 and then the washer-plate is pressed by any suitable instrument from its arched form into a flat condition parallel with the face of the base-plate 1, so that the opposite beveled edges 7 of the washer-plate enter into interlocked engagement with the opposite undercut shoulders 4, in such manner that the washer-plate is held in a fixed position and consequently the screw nut is locked against rotation. The undercut shoulders effectually prevent movement of the washer-plate in a direction away from the face of the base-plate 1 and by this means a very efficient and economical nut lock is produced.

The construction described and shown provides a nut lock which is more particularly designed for railway joints or fish-plates, but it can be used for other purposes.

The construction of the parts is simple and all can be economically produced by simplified machinery.

Having thus described my invention what I claim is:—

The combination of a base-plate having a bolt hole and opposite undercut shoulders, with a bolt, an angular screw nut, and an arched metallic washer-plate formed with an angular orifice receiving the angular nut, said washer-plate being adapted to be pressed from its arched form into a flat condition so that opposite edges thereof interlock with the opposite undercut shoulders of the base-plate, substantially as described.

In testimony whereof I have hereunto set my hand in presence of two subscribing witnesses.

GEORGE W. GRAFFLIN, JR.

Witnesses:
  ALBERT H. NORRIS,
  JNO. B. HOPPER.